Patented Nov. 15, 1932

1,887,662

UNITED STATES PATENT OFFICE

ROLAND R. READ, OF BALTIMORE, MARYLAND, ASSIGNOR TO SHARP & DOHME, INC., OF BALTIMORE, MARYLAND, A CORPORATION OF NEW JERSEY

BUTYL PHENOL COMPOSITION

No Drawing.    Application filed February 29, 1928. Serial No. 258,151.

The present invention relates to new compositions containing butyl phenols.

Liebmann (Berichte, 1881, vol. 14, page 1842; German Patent No. 17,311) describes the condensation of phenol with iso-butyl alcohol by means of zinc chloride and states that the iso-butyl phenol is a crystalline product of boiling point 236-238°. This "iso-butyl" phenol proved to be the tertiary butyl phenol. Reilly and Hickinbottom (Journal of the Chemical Society, 1920, vol. 117, page 121) describe an experiment in which phenol is condensed with normal butyl alcohol by means of zinc chloride and state that the product obtained consisted chiefly of para-secondary butyl phenol.

The new compositions of the present invention are obtained by the condensation of phenol with normal butyl alcohol but, instead of consisting chiefly of para-secondary butyl phenol, they consist chiefly of other constituents and contain substantial amounts of other butyl phenols, such as ortho-secondary butyl phenol, etc. The new butyl phenol compositions have remarkably high phenol coefficients around 36 to 40, and are valuable as antiseptics and germicides, or as ingredients of antiseptic or germicide compositions, etc.

To prepare the new butyl phenol composition phenol is condensed with normal butyl alcohol under conditions favoring the production of the new butyl phenol compositions. I have found that by using an excess of the normal butyl alcohol, together with a limited amount of concentrated hydrochloric acid, the normal butyl alcohol will condense smoothly with phenol in the presence of zinc chloride to give a product consisting of a mixture of butyl phenols consisting chiefly of other constituents than para-secondary butyl phenol, such a product having a boiling point range, for example, of from about 220-250° C. and having a phenol coefficient of around 37 to 40. I have also found that in the presence of concentrated hydrochloric acid, the temperature of the condensation can be considerably lowered, for example, from around 184-185° C. to around 130-135° C. The use of an excess of the normal butyl alcohol, in excess of that which enters into reaction with the phenol, increases the yield of the butyl phenol product, based upon the phenol employed.

The production of the new compositions is not limited, in its broader aspects, to the particular method of producing them, and the method of production can be somewhat varied, provided the condensation of the phenol and normal butyl alcohol is so carried out as to give a butyl phenol composition which has a high phenol coefficient.

The invention will be further illustrated by the following specific example, the parts being by weight.

85 parts of phenol and 150 parts of zinc chloride are mixed and heated to 130-140° C. with vigorous agitation under a reflux condenser. To this mixture is added during 2 hours a solution of 14 parts of concentrated hydrochloric acid in 35 parts of normal butyl alcohol. A further addition of 14 parts of concentrated hydrochloric acid in 105 parts of normal butyl alcohol is made over a period of 6 hours. Heating to the refluxing temperature is continued for a further period of 3 hours, the temperature being maintained at such a point that refluxing is vigorous. The oily reaction product separates from the aqueous layer. The oily reaction product is washed two or three times with water and is thus obtained as a crude reaction product. The excess alcohol and low boiling reaction products are removed by distillation until the temperature of the distillate reaches about 160° C.

For some purposes, as in the manufacture of certain antiseptic or disinfecting compositions, the crude reaction product can be employed without further purification, and without removal of any remaining phenol therefrom. This crude reaction product may contain some unchanged phenol and may also contain small amounts of tarry constituents. Its high phenol coefficient makes it a valuable crude product for use where a refined or purified product is not required. Its high phenol coefficient enables a small amount of it to be employed in place of much larger amounts, for example, of ordinary crude phenol.

The crude product can be further purified by subjecting it to distillation to remove first any unchanged phenol and then to distill the butyl phenol compositions over a boiling point range of, for example, from 220° C. up to around 255 or 265° C., leaving a tarry residue as the residue of the distillation. This product so obtained contains various constituents of both lower, intermediate and higher boiling point. A large part of the compositions is soluble in dilute alkali using, for example, 5% caustic soda solution and around 70% excess of the solution. The residue remaining after such extraction with 5% caustic soda solution is to a considerable extent soluble in a stronger caustic soda solution, for example, a 10% caustic soda solution. The residue from the extraction with 5% caustic soda solution appears to be made up to a considerable extent of higher boiling phenols which appear as alkali insoluble constituents with 5% caustic soda solution but as alkali soluble constituents with 10% caustic soda solution. The entire distillate, however, boiling between around 220 and 255 or 265° C. can be advantageously employed without further refining or fractionation as a new butyl phenol composition which is free or substantially so from unchanged phenol and also free or substantially so from tarry impurities or constituents. The higher boiling and lower boiling constituents of this composite product, as well as the constituents of intermediate boiling point, form valuable ingredients of the new compositions, and the composition as a whole has a high phenol coefficient, for example, around 35 to 40.

The product can be further purified by treating it with caustic soda solution to extract the butyl phenols and convert them into their sodium salts, where caustic soda is employed for the extraction, and the resulting solution can be separated from undissolved constituents. Depending upon the strength of the caustic soda solution, a somewhat greater or smaller amount of phenols will be extracted. As pointed out above, a 10% caustic soda solution will extract phenols which will not be readily extracted with a 5% caustic soda solution. Such solutions of the sodium salts of the butyl phenols also form a valuable antiseptic or disinfecting composition and can be used as such or as an ingredient of compositions intended for antiseptic or disinfecting purposes. By treating the solution of the sodium salts with an acid such as hydrochloric acid or carbon dioxide, the butyl phenols can be set free from the sodium salts and the composition again obtained in the form of an oil which in this case will be free from alkali-insoluble constituents. It is not necessary to separate the alkali insoluble constituents for most purposes, but the composition containing such constituents can advantageously be employed. When such alkali-insoluble constituents are separated, they may themselves be employed as an antiseptic or disinfecting composition, or as an ingredient of such composition; and the extracted phenols can similarly be employed by themselves either in the form of their sodium salts, or in the form of the free phenols regenerated from the sodium salts. In such case, it is not necessary to further fractionate the oil to separate the higher and lower boiling constituents, but the composition as a whole can be advantageously employed, with its constituents boiling between 220 and 235° as well as its constituents boiling above 245° and up to 255 or 265° C.

The proportions of higher boiling, intermediate boiling and lower boiling constituents, will vary somewhat with the conditions of the condensing process. The yield will also vary somewhat with the process. I have obtained, for example, with different processes, from around 1/5 to nearly 1/2 of the total distillate boiling between 220 and 235° C. I have obtained similar variations in the part of the distillate boiling between 245 and 265° C. The portion of the oil distilling between 235 and 245° C. has varied from considerably less than half the total oil up to more than half.

The fraction boiling between 235 and 245° C. undoubtedly contains considerable amounts of para-secondary butyl phenol, but it also contains considerable amounts of other phenols including ortho-secondary butyl phenol in substantial amounts, although the ortho-secondary butyl phenol will be largely present in the fraction boiling below 235° C. The fractionation of the oil for the purpose of separating any individual product is unnecessary, and the boiling points of certain of the butyl phenols are so close that it is extremely difficult to separate them from each other by fractional distillation. There is no need, however, of so separating them because they can advantageously be employed in admixture, and without separation, as a composite product having a high phenol coefficient. For example, the fraction boiling over the range of 235 to 250° C. has a phenol coefficient of about 38, while the total oil containing both higher and lower boiling constituents has a phenol coefficient approximately the same, varying, for example, from around 35 or somewhat lower to 40 or somewhat higher. By the use of proper apparatus and repeated distillations and crystallizations the para-secondary butyl phenol of boiling point of 240–242° C. and melting point 60–62° C. can be obtained, and also the ortho-secondary butyl phenol of boiling point 227 to 229° C.; but as above pointed out, there is no need of separating these individual phenols, or fractions consisting chiefly of them, because the composite product constitutes a valuable product of high phenol coefficient in much larger yields than would be the yield of the individual butyl phenols.

Ordinarily, where the crude product without further refining is not to be employed, a distillation of the crude product to remove unchanged phenol and tarry residue will be all that is needed; or the crude product can be subjected to alkali extraction, either before or after distillation, to separate the alkali-insoluble constituents from the alkali-soluble constituents, and these separated constituents can be employed separately for use as antiseptic or disinfecting compositions. When the crude product is purified by dissolving the butyl phenols in caustic alkali, separating the solution from the undissolved residue and acidifying the solution to set free the butyl phenol composition as an oil, this oil may be employed without further distillation, or it can be distilled in case, for example, it still contains small amounts of unchanged phenol or of tarry residue which can be removed by distillation, giving a distillate boiling, for example, between 220 and 255 or 265° C.

Instead of starting with normal butyl alcohol and condensing it with phenols, secondary butyl alcohol can be subjected to condensation with phenols to produce a product of similar composition and properties boiling over the same or a similar range. In this condensation, the amount of zinc chloride required is only about ⅓ to ½ of that given in the above example.

Instead of using phenols for condensation with butyl alcohol, the individual and mixed cresols can be employed to give similar mixtures of butyl cresols.

The new compositions of the present invention, because of their high phenol coefficient, are particularly valuable for use as antiseptics or disinfectants, or in combination or admixtures or solution with other ingredients to form antiseptic or disinfecting compositions. Their high phenol coefficients enables them to be used in high dilution and nevertheless give results superior to those obtained with phenols in far greater amounts, and without the objections to the use of ordinary phenols. The new butyl phenol compositions are of value, for example, in making soap where they impart to the soap valuable antiseptic or disinfecting properties. The new compositions can also be employed as emulsions and in other forms where their valuable antiseptic and disinfecting properties are taken advantage of.

This invention relates to the new butyl phenol compositions. It does not include the method of preparing these compositions. The method is claimed in my copending application, Serial No. 637,199 filed October 10th, 1932.

I claim:—

1. A new butyl phenol composition containing a substantial amount of ortho-secondary butyl phenol and having a boiling point range between 220 and 265° C.

2. A new butyl phenol composition containing a substantial amount of ortho-secondary butyl phenol and having a phenol coefficient of about 36 to 40.

3. A butyl phenol composition substantially free from constituents insoluble in a five per cent caustic soda solution and containing a substantial amount of ortho-secondary butyl phenol.

4. A new composition comprising a product of the condensation of butyl alcohol and phenol in the presence of zinc chloride and concentrated hydrochloric acid which product contains a substantial amount or ortho secondary butyl phenol and has a boiling range between 220° and 265° C.

In testimony whereof I affix my signature.

ROLAND R. READ.